(12) United States Patent
Wobben

(10) Patent No.: US 7,550,088 B2
(45) Date of Patent: Jun. 23, 2009

(54) METHOD AND DEVICE FOR DESALINATING WATER WHILE OVERCOMING DECREASES IN PRESSURE

(76) Inventor: Aloys Wobben, Argestrasse 19, Aurich (DE) 26607

( * ) Notice: Subject to any disclaimer, the term of this patent is extended or adjusted under 35 U.S.C. 154(b) by 419 days.

(21) Appl. No.: 10/533,851

(22) PCT Filed: Jul. 21, 2003

(86) PCT No.: PCT/EP03/07916

§ 371 (c)(1),
(2), (4) Date: Nov. 28, 2005

(87) PCT Pub. No.: WO2004/041418

PCT Pub. Date: May 21, 2004

(65) Prior Publication Data

US 2006/0124546 A1    Jun. 15, 2006

(30) Foreign Application Priority Data

Nov. 5, 2002   (DE) ................................. 102 51 342

(51) Int. Cl.
*B01D 61/00* (2006.01)
*B01D 24/00* (2006.01)
*B01D 63/00* (2006.01)
(52) U.S. Cl. .................. 210/652; 210/416.1; 210/416.3; 210/257.2; 210/195.2
(58) Field of Classification Search .................. 210/652, 210/257.2, 416.1, 416.3, 195.1
See application file for complete search history.

(56) References Cited

U.S. PATENT DOCUMENTS

| | | | | |
|---|---|---|---|---|
| 3,498,910 A | | 3/1970 | Mendelson | .................. 210/23 |
| 4,124,488 A | * | 11/1978 | Wilson | ........................ 210/134 |
| 4,178,240 A | * | 12/1979 | Pinkerton | .................... 210/646 |
| 4,187,173 A | | 2/1980 | Keefer | ....................... 210/23 H |
| 4,367,140 A | * | 1/1983 | Wilson | ........................ 210/110 |
| 4,434,056 A | * | 2/1984 | Keefer | ......................... 210/637 |

(Continued)

FOREIGN PATENT DOCUMENTS

CA   2379721 A1   1/2001

(Continued)

*Primary Examiner*—Ana M Fortuna
(74) *Attorney, Agent, or Firm*—Seed IP Law Group PLLC

(57) ABSTRACT

The invention concerns a method of and an apparatus for continuously desalinating water by reverse osmosis, in particular desalinating sea water, wherein salt water is introduced under a first pressure by means of a delivery pump into a pressure compensating device, salt water is continuously introduced from the pressure compensating device at a second increased pressure into a membrane module and separated therein by means of a membrane into desalinated water and concentrated salt water, and the concentrated salt water discharged from the membrane module is continuously introduced under approximately the second pressure into the pressure compensating device and used there for acting with approximately the second pressure on the salt water introduced into the pressure compensating device and for introducing the salt water into the membrane module. In order to avoid disturbances in operation and possibly damage to the membrane because of a reduced flow over the membrane surface, it is provided in accordance with the invention that a continuous flow of the salt water introduced into the membrane module is maintained over the surface of the membrane by means of salt water discharged from a reservoir.

20 Claims, 2 Drawing Sheets

U.S. PATENT DOCUMENTS

Figure 1:
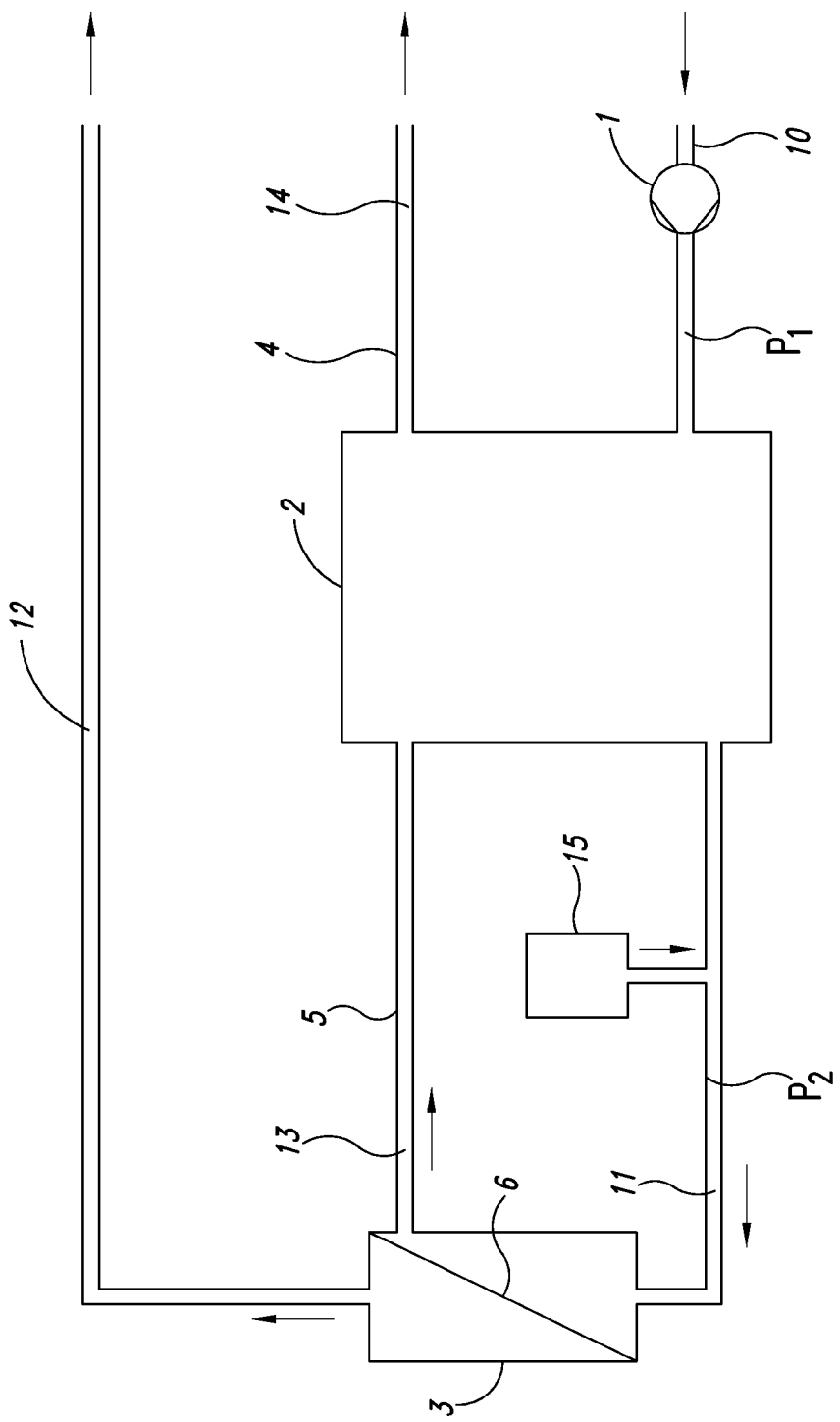

| | | | |
|---|---|---|---|
| 4,913,809 A * | 4/1990 | Sawada et al. | 210/98 |
| 5,531,887 A * | 7/1996 | Miers | 210/135 |
| 5,628,198 A * | 5/1997 | Permar | 62/123 |
| 6,017,200 A * | 1/2000 | Childs et al. | 417/404 |
| 6,558,537 B1 * | 5/2003 | Herrington et al. | 210/192 |
| 6,841,076 B1 * | 1/2005 | Wobben | 210/652 |
| 7,189,325 B2 * | 3/2007 | Wobben | 210/637 |

FOREIGN PATENT DOCUMENTS

| | | |
|---|---|---|
| DE | 33 44 628 A1 | 6/1984 |
| DE | 39 23 722 C2 | 1/1991 |
| EP | 0 018 128 A1 | 10/1980 |
| EP | 0 055 981 A1 | 7/1982 |
| FR | 1 585 376 | 1/1970 |
| FR | 2 568 321 A1 | 1/1986 |
| GB | 2088968 A | 6/1982 |
| JP | 61081584 A | 4/1986 |
| WO | WO 00/76639 A1 | 12/2000 |
| WO | WO 02/41979 A1 | 5/2002 |

* cited by examiner

METHOD AND DEVICE FOR DESALINATING WATER WHILE OVERCOMING DECREASES IN PRESSURE

BACKGROUND OF THE INVENTION

1. Field of the Invention

The invention concerns a method and a corresponding apparatus for continuously desalinating water by reverse osmosis, in particular for desalinating sea water.

2. Description of the Related Art

An apparatus of that kind is described for example in WO 02/41979 A1. In that apparatus the salt water is introduced under a first pressure into a pressure compensating device and from there passed under a second higher pressure into a membrane module. In the membrane module, it is separated into desalinated water and concentrated salt water. The discharged concentrated salt water which is approximately still at the second pressure is continuously introduced into the pressure compensating device again and is used therein for subjecting the salt water introduced into the pressure compensating device to approximately the second pressure and for introducing the salt water into the membrane module. More specifically the pressure compensating device described therein has two piston/cylinder devices which operate in opposite phase relationship and the pistons of which are fixedly connected together by a piston rod which is additionally driven.

In desalination installations of that kind which operate on the basis of the principle of reverse osmosis, separation into concentrated salt water and desalinated water is effected at a so-called 'crossflow' membrane disposed in the membrane module. In the case of such a membrane, the salt water introduced flows along the surface of the membrane while a part thereof passes as desalinated water (drinking water) in a direction perpendicularly thereto through the membrane. The mutually crossing flows of water are also referred to as 'crossflow'. In that case the flow on the surface of the membrane also flushes away unwanted foreign bodies on the surface of the membrane and accordingly therefore provides for continuously cleaning of the membrane.

In the known configuration of the desalination apparatus having two piston/cylinder devices, a sufficiently high pressure is admittedly present at the moment of switching over the direction of movement of the pistons, to further press water through the membrane and thus produce desalinated water. It has been found however that the crossflow collapses at the time of switching over the direction of movement. As a result, at that moment the membrane is no longer sufficiently flushed so that the situation can involve salt molecules becoming concentrated on the surface of the membrane, and that can result in a rise in osmotic pressure and thus the operating pressure to the stage of a salt crust being formed on the surface of the membrane and operation being permanently interrupted.

U.S. Pat. No. 4 187 173 and EP 0 018 128 A1 disclose a method of and an apparatus for desalinating water on the basis of reverse osmosis, wherein a respective pressure compensating container is provided both in the feed water circuit and also—in U.S. Pat. No. 4 187 173—in the concentrate circuit. Those pressure compensating containers are in the configuration therein of pulsation dampers or differential pressure dampers, in which a piston is displaceable in a cylinder and subdivides the interior of the cylinder into two chambers. For discharge of feed water disposed in a chamber, it is provided therein that pressure is applied to the piston by means of concentrate introduced into the second chamber, and a spring disposed in that chamber.

FR 2 568 321 and EP 0 055 981 A1 disclose further apparatuses for and methods of reverse osmosis.

BRIEF SUMMARY OF THE INVENTION

According to principles of the present invention methods and apparatuses for continuously desalinating water by reverse osmosis which operate with a described membrane module, provide measures for avoiding the disruption of the desalination process.

In accordance with the invention that object is attained by a method as set forth in claim 1.

A corresponding apparatus for resolving the problems described is set forth in claim 4. Advantageous configurations of the method according to the invention and the apparatus according to the invention are recited in the dependent claims.

In that respect, the invention is based on the realization that the problems described, in particular an interruption in operation by virtue of contamination and fouling of the membrane surface or indeed damage to the membrane can be avoided by the flow over the membrane being continuously maintained by suitable means. In accordance with the invention, provided for that purpose is a reservoir which acts on the salt water introduced into the membrane module and which, to maintain the flow over the membrane, additionally introduces water, in particular salt water, into the membrane module.

In accordance with the invention there is further provided a piston-cylinder device having a piston which subdivides the cylinder interior into three chambers, wherein the salt water flowing out of the pressure compensating device is present in an inlet chamber, the concentrated salt water flowing out of the membrane device is present in an outlet chamber and a medium stored in a pressure reservoir, for example also water or a hydraulic liquid, is present under a high pressure in a pressure chamber. In that respect the desired effect of maintaining the flow by the discharge of water from the reservoir preferably occurs of its own accord. It is however also possible to provide a suitable control device for controlling the piston/cylinder device in order to afford the desired pressure-assisting effect.

Some possible configurations of that piston-cylinder device are recited in claims 6 and 7.

It is preferably provided that, for example at the switching-over time in the case of the known apparatus with two piston/cylinder devices, a pressure drop or flow drop is bridged over in order to maintain the continuous flow over the membrane. By way of example suitable sensors can be provided for measuring a reduction in the flow over the membrane.

In accordance with the invention, there are preferably provided two piston/cylinder devices which operate in opposite phase relationship, as are known from WO 02/41979 A1. The reservoir then provides that, upon a change in the direction of movement of the pistons, that is to say in particular at the moment when the pistons are stationary, an assisting pressure is exerted on the salt water. Thus in particular at that switching-over time, a possible pressure drop is compensated and the flow is maintained over the membrane.

A further advantageous configuration is provided in claim 3. In that case, the pressure required for discharge of the water from the reservoir is produced on the one hand from the pressure of the concentrated salt water discharged from the membrane module and in addition from a pressure stored in a pressure reservoir, wherein the pressure which results overall must naturally be greater if necessary than the pressure of the salt water flowing out of the pressure compensating device.

BRIEF DESCRIPTION OF THE SEVERAL VIEWS OF THE DRAWING(S)

Figure 2:
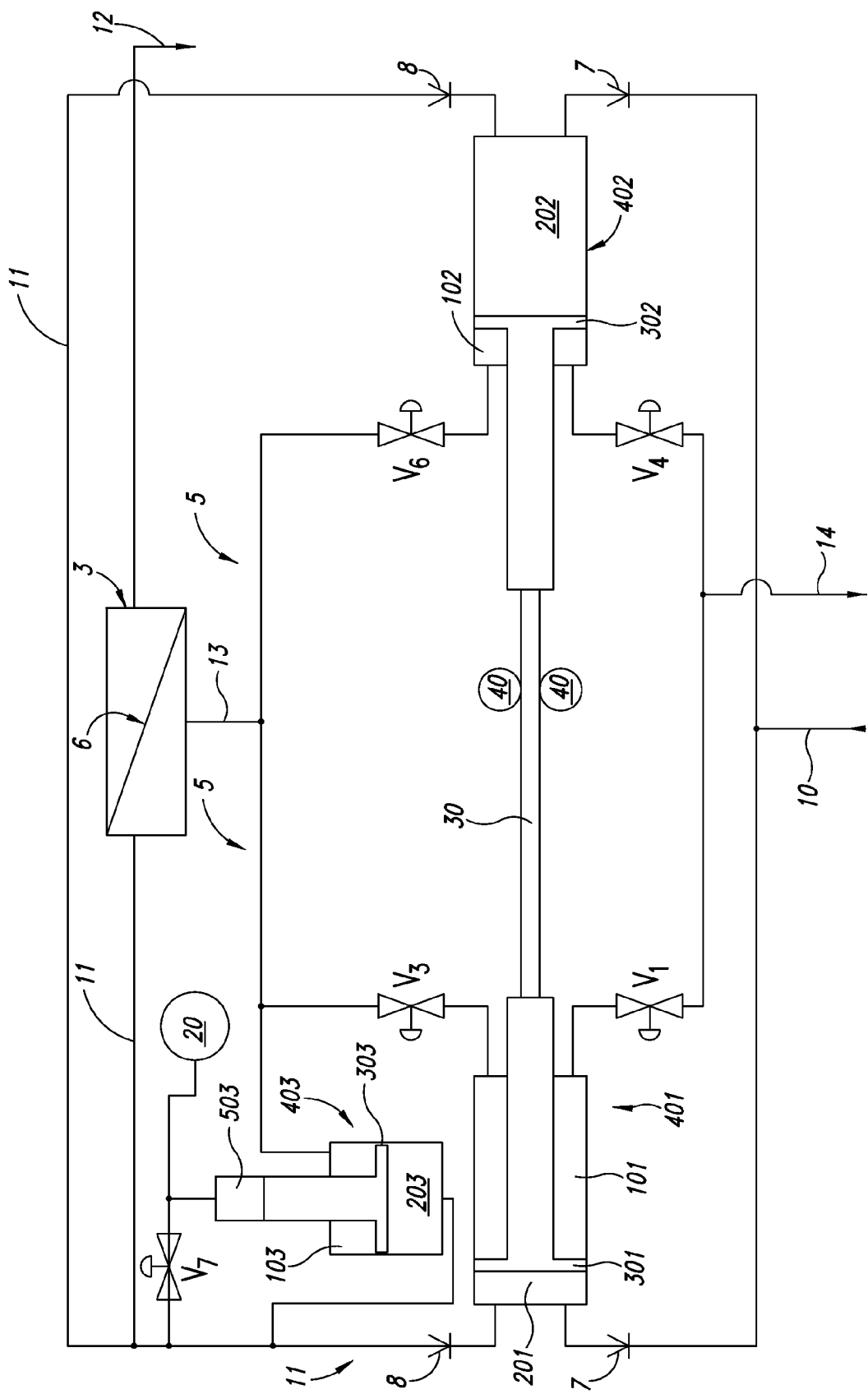

The invention is described in greater detail hereinafter with reference to the drawing in which:

FIG. 1 shows a block circuit diagram to explain the method according to the invention, and FIG. 2 shows an embodiment of an apparatus according to the invention.

DETAILED DESCRIPTION OF THE INVENTION

The block circuit diagram in FIG. 1 shows a delivery pump 1 for introducing salt water 10 into a pressure compensating device 2 under a first pressure p1. The same salt water 11 which however is now subjected to a high working pressure p2 is passed from the pressure compensating device 2 to the membrane module 3. There a part of the salt water 11 passes through the membrane 6 which is preferably in the form of a so-called crossflow membrane, for example 25% of the salt water 11, it is desalinated in doing so and it is discharged in the form of desalinated water 12. The remaining part of the salt water 11, for example 75%, cannot pass through the membrane 6 but flows along the surface of the membrane 6 into the connecting conduit 5, by way of which it is discharged from the membrane module 3 as concentrated salt water 13. The concentrated salt water 13 which in that case is still at a high pressure which approximately corresponds to the pressure p2 but is somewhat lower is then passed to the pressure compensating device 2 again. There, that high pressure p2 is used in a manner that is still to be described in detail hereinafter for the purposes of acting with pressure on the salt water introduced into the pressure compensating device 2, and feeding it to the membrane module 3 at the inlet thereof. At the same time that pressure is used in the pressure compensating device to definitively discharge concentrated salt water 14 therein, by way of the discharge conduit 4, and to feed unconcentrated salt water 10 to the pressure compensating device 2. All the described procedures take place in that case simultaneously and continuously so that there is no need for a high-pressure pump for subsequently delivering the high working pressure and desalinated water 12 is continuously available.

As was described hereinbefore, particularly when using a crossflow membrane 6 it is necessary for the flow of the salt water over the surface of the membrane to be maintained continuously and under a uniformly high pressure as otherwise salt molecules can be deposited at the surface of the membrane, and such molecules can result in damage to the membrane or an interruption in operation of the system. By virtue of various circumstances however it can happen that the pressure p2 of the salt water discharged from the pressure compensating device 2 briefly falls so greatly that the flow over the surface of the membrane would be reduced or even interrupted. Desalination would then admittedly still take place; it will be noted however that the membrane could be damaged as the concentrated salt water 13 cannot flow away out of the membrane module 3. In order in such a situation to maintain the pressure p2 and the flow, there is therefore provided in accordance with the invention a reservoir 15 which in such a situation passes additional water into the membrane module 3 and thus ensures that the high working pressure p2 remains maintained and the flow over the surface of the membrane is not reduced.

FIG. 2 shows a specific configuration of an apparatus according to the invention. It has two identical piston/cylinder devices 401, 402 with two aligned mutually opposite cylinders which each have a respective inlet chamber 201, 202 for receiving the salt water and a respective outlet chamber 101, 102 for receiving the concentrated salt water 13. Arranged within each of the piston/cylinder devices 401, 402 is a respective special piston 301, 302 which subdivides the piston interior into the above-mentioned chambers and which in the Figure is displaceable in the horizontal direction within the piston/cylinder device.

From the delivery pump 1, a respective feed conduit with a passive non-return valve 7 leads to the inlet chambers 201, 202. The non-return valves 7 in that case are of such a configuration that they open and permit a through flow when the pressure in the feed conduit is greater than in the inlet chambers 201, 202. Comparable non-return valves 8 which however involve a different through-flow direction are disposed in the feed conduits from the inlet chambers 201, 202 to the membrane module 3.

In contrast, actively switchable main valves V3, V6 and V1, V4 respectively are arranged in the feed conduits 5 from the membrane module 3 to the outlet chambers 101, 102 and in the discharge conduits 4 from the outlet chambers 101, 102; the feed flow of the concentrated salt water 13 from the membrane module 3 and the discharge flow of the concentrated salt water 14 out of the pressure compensating device 2 respectively can be controlled by way of the above-mentioned main valves.

The pistons 301, 302 are fixedly connected together by means of a piston rod 30. Pinions 40 which for example can be driven by electric gear motors and which engage into a tooth arrangement provided on the piston rod 30 can drive the piston rod 30 and by way thereof the pistons 301, 302 in order to compensate for pressure losses.

The pistons are arranged in such a way that they operate in opposite phase relationship. When therefore one piston is disposed in a position in which the volume of the inlet chamber 202 is at a maximum and the volume of the outlet chamber 102 is at a minimum, then the other piston which is connected by way of the piston rod 30 is in a position in which the volume of the inlet chamber 201 is at a minimum and the volume of the outlet chamber 101 is at a maximum (see FIG. 2). In that situation the inlet chamber 202 is filled with water and the outlet chamber 101 is filled with concentrated salt water. The valves V1, V3, V4 and V6 which are illustrated here as switches are controlled in such a way that V3 and V4 are now closed while V1 and V6 are opened.

In this connection opening a valve signifies producing a flow communication in order to allow a through-flow, for which purpose the valve is purely mechanically opened. Similarly closing a valve signifies interrupting a flow communication in order to prevent a through-flow, for which purpose the valve is purely mechanically closed.

By virtue of the main valve V1 being open, firstly the pressure of the concentrated salt water in the outlet chamber 101 escapes. By virtue of opening of the main valve V6 the outlet chamber 102 is subjected to the effect of pressure (for example about 65 bars) and the concentrated salt water flows into that chamber. At the same time the salt water disposed in the inlet chamber 202 is pressed to the membrane module 3 by the piston subjected to pressure.

As the pistons are arranged in such a way that they operate in opposite phase relationship, introduction of the concentrate which is subjected to pressure (for example 65 bars) into the outlet chamber 102 by the piston rod 30 causes movement of the other piston 301 which as a result empties the pressureless outlet chamber 101. At the same time a reduced pressure is produced in the inlet chamber 201 and sucks in the salt water and fills that chamber.

When the outlet chamber 102 is filled the main valves are suitably controlled and the opposite procedure takes place.

As the membrane module is preferably operated at about 70 bars in order to provide for a sufficiently high level of fresh water, and at a maximum about 5-10 bars occur as a pressure loss at the membrane, at least the above-mentioned pressure of about 65 bars of the concentrated salt water is still available at the concentrate discharge 5 of the membrane module 3.

In order to maintain the flow of the water along the surface of the membrane 6 during the operation of switching over the direction of movement of the pistons 301, 302, in particular at the moment when the pistons 301, 302 are stopped, in accordance with the invention there is provided an additional piston/cylinder device 403, referred to hereinafter as the piston reservoir. It has three chambers, namely a feed water chamber, inlet chamber 203, which is connected to the feed conduit for the salt water 11 which is fed in, a concentrate chamber, outlet chamber 103, connected to the concentrate conduit 5 and a pressure chamber 503. In that arrangement the pressure chamber 503 is connected on the one hand by way of an active valve V7 to the feed conduit 11 and on the other hand directly to a pressure reservoir 20, preferably a bladder reservoir. During operation the valve V7 is always closed, it only serves to be able to fill up the circuit comprising the pressure chamber 503 and the pressure reservoir 20 again with the pressure fluid, for example a hydraulic fluid, after an interruption in operation, and to restore the required high pressure in the pressure reservoir 20.

If the effective piston area of the piston 303 in the concentrate chamber 103 is about three quarters of the piston area in the feed water chamber 203 and the piston area in the pressure chamber 503 is about a quarter of that area, the pressure distributions are as follows. The feed water chamber 203 is subjected to a pressure of about 70 bars in operation. That results in up to 280 bars in the circuit comprising the pressure chamber 104 and the pressure reservoir 20. They are however not attained in operation. The operating pressure in that region is between about 200 and 210 bars.

At the time of switching over the direction of movement of the pistons 301, 302, a pressure of about 70 bars acts on the piston 303, from the feed water chamber 203. The pressure in the reservoir 20 is only 160 bars. Then, from there, because of the smaller piston area in the pressure chamber 503, the pressure acting is about 160/4, that is to say about 40 bars. The pressure in the concentrate circuit, that is to say the pressure of the concentrated salt water 13 discharged from the membrane module 3, is about 68 bars. That pressure acts on an area which includes three quarters of the piston area. Consequently a pressure of about 51 bars acts here. Those two pressures act in the same direction and are thus added to give a total of about 91 bars. Only the approximately 70 bars in the feed water chamber 203 acts against that resulting pressure. Accordingly there is a sufficiently high pressure to press the piston 203 downwardly in the illustrated position and thus to maintain the flow over the membrane 6.

Even if it is only a pressure of about 60 bars that is taken as the basis for the concentrate circuit, that still affords a proportion of 45 bars in the concentrate chamber 103. Even if the pressure in the pressure reservoir 20 is only 120 bars, that results in a further 30 bars, so that there is still an overall pressure of 75 bars, which allows the flow over the membrane 6 to be maintained.

The piston reservoir 403 can be controlled in such a way that it is only in the case of a pressure drop in the connecting conduit between the inlet chambers 201, 202 and the membrane module 3 or a reduction in the flow over the membrane 6, that an additional pressure is exerted on that connecting conduit. For that purpose it is possible to provide for example suitable sensors which detect such a pressure drop or a reduction in flow and which trigger the appropriate pressure control procedure. In addition it is also possible to provide valves which are suitably controlled for that purpose in the concentrate conduit 5 between the membrane module 3 and the piston/cylinder device 403, which are opened if necessary, in order to produce the described movement of the piston 303 downwardly by the introduction of a pressure into the concentrate chamber 103. If in contrast such pressure assistance is not required, such a valve can also be closed again so that, because of the higher pressure in the feed water chamber 203 in relation to the pressure chamber 503, the piston 303 is moved upwardly again and thus remains virtually in the readiness position.

In the case of the piston reservoir 403 according to the invention however such a control can be omitted as it can automatically set the specified pressure conditions in operation and the desired effect is achieved by separate control. On the one hand then feed water can flow out of the chamber 203 and on the other hand concentrate can flow out of the membrane module 3, into the chamber 103, so that the flow over the membrane 6 is maintained.

In addition it is also possible to additionally provide secondary or bypass valves parallel to the described main valves V1, V3, V4, V6 in order to reduce the loading on the main valves and thus to increase the service life thereof. In addition it is also possible to provide one or more quantitative flow limiting devices which are intended to prevent an abrupt pressure compensation effect insofar as they limit the maximum quantitative through-flow and thus contribute to a gradual compensation of pressure and slow changes in pressure, instead of abrupt pressure fluctuations. Elements of that kind and further elements are described and illustrated in above-mentioned WO 02/41979 A1 to which reference is hereby expressly directed and the description of which is to be deemed to be included herein. The basic mode of operation of such an apparatus with two piston/cylinder devices is also discussed in detail therein, and reference is also made thereto.

The invention can also be used in relation to apparatuses of a different configuration for the desalination of water by reverse osmosis, which for example, instead of the illustrated two piston/cylinder devices, have another number of such devices, for example one or three piston/cylinder devices. They can in principle also be of a different configuration. The configuration of the reservoir in the form of the piston/cylinder device with three chambers, as is shown in FIG. 2, is also not absolutely necessary but in principle can also be of a different nature.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of continuously desalinating water by reverse osmosis, comprising:
   introducing salt water under a first pressure by means of a delivery pump into a pressure compensating device having a piston/cylinder device with a salt water chamber and a concentrated salt water chamber,
   introducing salt water from the salt water chamber of the pressure compensating device at a second increased pressure into a salt water chamber of a membrane module and separated therein by means of a membrane into desalinated water and concentrated salt water,
   discharging the concentrated salt water from salt water chamber of the membrane module at approximately the second pressure,
   introducing the concentrated salt water under approximately the second pressure into the concentrated salt water chamber of the pressure compensating device, wherein the concentrated salt water introduced into the concentrated salt water chamber of the pressure compensating device acts with approximately the second pressure on the salt water introduced into the salt water chamber of the pressure compensating device and acts on the salt water introduced into the membrane module, and
   maintaining a continuous flow of the salt water over a surface of the membrane in the membrane module by means of salt water discharged from a piston reservoir having a pressure chamber, an outlet chamber, an inlet chamber and a piston, the piston having a front side facing the inlet chamber and a rear side having a first portion facing the outlet chamber and a second portion facing the inlet portion, each one of the front side of the piston and the first portion and the second portion of the rear side of the piston having a respective surface area, the inlet chamber connected to the salt water chamber of the pressure compensating device and the salt water chamber of the membrane module, the outlet chamber connected to a concentrated salt water outlet of the membrane module, and the pressure chamber connected to a pressure reservoir, and
   applying an assisting pressure from the pressure reservoir to the pressure chamber, wherein the respective surface areas front side of the piston and the first portion and the second portion of the rear side of the piston have ratios such that the assisting pressure helps to produce at predetermined moments in time a respective pressure, which is greater than the second pressure of the salt water discharged from the pressure compensating device, in the inlet chamber.

2. A method according to claim 1 characterised in that the pressure compensating device has two piston/cylinder devices, each of the two piston/cylinder devices having a respective piston and further comprising operating the two piston/cylinder devices of the pressure compensating device in opposite phase relationship, and wherein maintaining a continuous flow of the salt water over a surface of the membrane in the membrane module by means of salt water discharged from a pressure booster further includes passing water from the inlet chamber of the pressure booster into the membrane module upon a change in a direction of movement of the pistons.

3. A method according to claim 1 further comprising applying the approximately second pressure of the concentrated salt water discharged from the membrane module to the outlet chamber to help produce the respective pressure in inlet chamber.

4. A method according to claim 1 further comprising:
   recharging the pressure reservoir via a salt water conduit connecting the pressure reservoir and the salt water inlet of the membrane module.

5. Apparatus for continuously desalinating water by reverse osmosis, comprising:
   a pressure compensating device having a piston/cylinder device and defining a salt water chamber for receiving and discharging salt water and a concentrated salt water chamber for receiving and discharging concentrated salt water, the piston/cylinder device receiving salt water at a first pressure and discharging the salt water from the salt water chamber at a second pressure that is greater than the first pressure,
   a delivery pump for introducing salt water under the first pressure into the salt water chamber of the pressure compensating device,
   a membrane module having a membrane for separating introduced salt water into desalinated water and concentrated salt water, the membrane module receiving the salt water at the second pressure from the pressure compensating device via a salt water inlet and discharging concentrated salt water at a concentrated salt water outlet, and
   a pressure booster for maintaining a continuous flow of the salt water introduced into the membrane module over a surface of the membrane by the discharge of salt water from the pressure booster into the membrane module, the pressure booster having a piston reservoir with a piston, a pressure chamber, and a pressure reservoir, the piston having a front side with a respective surface area and a rear side with a respective surface area, wherein at the front side of the piston, the pressure booster has an inlet chamber connected to the salt water chamber of the pressure compensating device and the salt water inlet of the membrane module and at the rear side of the piston, the pressure booster has an outlet chamber connected to the concentrated salt water outlet of the membrane module and the pressure chamber which is connected to the pressure reservoir, and that the surface area of the front side of the piston and the surface area of the rear side of the piston have a ratio such that at predetermined moments in time a respective pressure is produced in the inlet chamber of the pressure booster, wherein the respective pressure is greater than the second pressure of the salt water discharged from the pressure compensating device.

6. Apparatus according to claim 5 characterised in that the pressure compensating device has two piston/cylinder devices operating in opposite phase relationship and each having a respective piston and that the pressure booster passes salt water out of the pressure booster into the membrane module upon a change in a direction of movement of the pistons.

7. Apparatus according to claim 5 characterised in that the piston is of such a configuration that a pressure obtained in the pressure chamber can act on approximately a quarter of the surface area of the piston rear side and a pressure obtained in the outlet chamber can act approximately on three quarters of the surface area of the piston rear side.

8. Apparatus according to claim 5 characterised in that the pressure reservoir has a pressure which is at least double the second pressure.

9. Apparatus according to claim 5 wherein the pressure reservoir is in fluid communication with the salt water inlet of the membrane module.

10. Apparatus according to claim 5 wherein the pressure chamber is in fluid communication with the salt water inlet of the membrane module.

11. Apparatus according to claim 5 further comprising:
a first fluid conduit connected to the pressure reservoir; and
a valve connected to the first fluid conduit, the valve providing fluidic communication between the salt water inlet of the membrane module and the pressure reservoir.

12. Apparatus according to claim 5 further comprising:
a first fluid conduit connected to the pressure reservoir; and
a valve connected to the first fluid conduit, the valve providing fluidic communication between the salt water inlet of the membrane module and the pressure reservoir.

13. A method of continuously desalinating water by reverse osmosis, comprising:
introducing salt water under a first pressure by means of a delivery pump into a pressure compensating device having a piston/cylinder device with a salt water chamber and a concentrate salt water chamber;
introducing salt water from the salt water chamber of the pressure compensating device at a second increased pressure into a salt water chamber of a membrane module and separated therein by means of a membrane into desalinated water and concentrated salt water;
discharging the concentrated salt water from the salt water chamber of the membrane module at approximately the second pressure;
introducing the concentrated salt water under approximately the second pressure into the concentrated salt water chamber of the pressure compensating device, wherein the concentrate salt water introduced into the concentrate salt water chamber of the pressure compensating device acts with approximately the second pressure on the salt water introduced into the salt water chamber of the pressure compensating device and on the salt water introduced into the membrane module; and
maintaining a continuous flow of the salt water over a surface of the membrane in the membrane module by means of salt water discharged from a piston reservoir,
the piston reservoir having a reservoir with a piston, a inlet chamber, a pressure chamber, and a pressure reservoir connected to the pressure chamber;
the piston having a front side with a respective surface area and a rear side with a respective surface area, wherein at the front side, the piston is in contact with the inlet chamber of the piston reservoir, and the inlet chamber is connected to the salt water chamber of the pressure compensating device and the salt water chamber of the membrane module;
an outlet chamber at the rear side of the piston connected to a concentrated salt water outlet of the membrane module;
said pressure chamber positioned to exert pressure on the piston in the piston reservoir in operation, and the surface area of the front side to the piston in the piston reservoir and the surface area of the rear side of the piston in the piston reservoir have a ratio such that at predetermined moments in time a respective pressure is produced in the inlet chamber of said piston reservoir which is greater than the second pressure of the salt water discharged from the pressure compensating device.

14. A method according to claim 13 wherein the pressure compensating device has two piston/cylinder devices, each of the two piston/cylinder devices having a respective piston and further comprising operating the two piston/cylinder devices of the pressure compensating device in opposite phase relationship, and wherein maintaining a continuous flow of the salt water over a surface of the membrane in the membrane module by means of salt water discharged from a piston reservoir further includes passing water from the inlet chamber of the piston reservoir into the membrane module upon a change in a direction of movement of the pistons.

15. A method according to claim 13 wherein the respective pressure produced in the inlet chamber of said piston reservoir includes combining the approximately second pressure of the concentrated salt water discharged from the membrane module with an assisting pressure from the pressure reservoir.

16. A method according to claim 13 comprising:
recharging the pressure reservoir via a salt water conduit connecting the pressure reservoir and the salt water inlet of the membrane module.

17. Apparatus for continuously desalinating water by reverse osmosis, comprising:
a pressure compensating device having a piston/cylinder device and defining a salt water chamber for receiving and discharging salt water and a concentrated salt water chamber for receiving and discharging concentrated salt water, the piston/cylinder device receiving salt water at a first pressure and discharging the salt water from the salt water chamber at a second pressure that is greater than the first pressure,
a delivery pump for introducing salt water under the first pressure into the salt water chamber of the pressure compensating device,
a membrane module having a membrane for separating introduced salt water into desalinated water and concentrated salt water, the membrane module receiving the salt water at the second pressure from the pressure compensating device via a salt water inlet and discharging concentrated salt water at a concentrated salt water outlet, and
a piston reservoir for maintaining a continuous flow of the salt water introduced into the membrane module over a surface of the membrane by the discharge of salt water from the piston reservoir into the membrane module, the piston reservoir having a piston, a pressure chamber, and a pressure reservoir, the piston having a front side with a respective surface area and a rear side with a respective surface area, wherein at the front side of the piston, the piston reservoir has an inlet chamber connected to the salt water chamber of the pressure compensating device and the salt water inlet of the membrane module and at the rear side of the piston, the piston reservoir has an outlet chamber connected to the concentrated salt water outlet of the membrane module;
wherein the pressure chamber is connected to the pressure reservoir, and positioned to exert a pressure into the inlet chamber in said piston reservoir, and the surface area of the front side of the piston and the surface area of the rear side of the piston have a ratio such that at predetermined moments in time a respective pressure is produced in the inlet chamber of the piston reservoir, wherein the respective pressure is greater than the second pressure of the salt water discharged from the pressure compensating device.

18. Apparatus according 17 wherein the pressure compensating device has two piston/cylinder devices operating in opposite phase relationship and each having a respective piston and that the piston reservoir passes salt water out of the piston reservoir into the membrane module upon a change in a direction of movement of the pistons.

19. Apparatus according to claim 17 wherein the piston is of such a configuration that a pressure obtained in the pressure chamber can act on approximately a quarter of the surface area of the piston rear side and a pressure obtained in the outlet chamber can act approximately on three quarters of the surface area of the piston rear side.

20. Apparatus according to claim 17 wherein the pressure reservoir has a pressure which is at least double the second pressure.

\* \* \* \* \*